United States Patent
Yao et al.

(10) Patent No.: US 12,177,826 B2
(45) Date of Patent: Dec. 24, 2024

(54) SYSTEM AND METHODS FOR MULTI-PHYSICAL UPLINK SHARED CHANNEL (PUSCH) CONFIGURED GRANT

(71) Applicant: Apple Inc., Cupertino, CA (US)

(72) Inventors: Chunhai Yao, Beijing (CN); Chunxuan Ye, San Diego, CA (US); Seyed Ali Akbar Fakoorian, San Diego, CA (US); Haitong Sun, Cupertino, CA (US); Hong He, San Jose, CA (US); Huaning Niu, San Jose, CA (US); Weidong Yang, San Diego, CA (US); Yushu Zhang, Beijing (CN); Dawei Zhang, Saratoga, CA (US); Sigen Ye, Whitehouse Station, NJ (US); Oghenekome Oteri, San Diego, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/442,204

(22) PCT Filed: Aug. 5, 2021

(86) PCT No.: PCT/CN2021/110913
§ 371 (c)(1),
(2) Date: Sep. 23, 2021

(87) PCT Pub. No.: WO2023/010418
PCT Pub. Date: Feb. 9, 2023

(65) Prior Publication Data
US 2024/0163861 A1 May 16, 2024

(51) Int. Cl.
*H04W 72/20* (2023.01)
*H04W 72/115* (2023.01)
*H04W 72/56* (2023.01)

(52) U.S. Cl.
CPC .......... *H04W 72/115* (2023.01); *H04W 72/20* (2023.01); *H04W 72/56* (2023.01)

(58) Field of Classification Search
CPC .... H04W 72/56; H04W 72/20; H04W 72/115
(Continued)

(56) References Cited

U.S. PATENT DOCUMENTS

| 2022/0061070 A1 | 2/2022 | Miao et al. |
| 2022/0158769 A1 | 5/2022 | Gou et al. |
| 2022/0322243 A1* | 10/2022 | Huang ................. H04W 52/281 |

FOREIGN PATENT DOCUMENTS

| CN | 110535555 A | 12/2019 |
| CN | 111294936 A | 6/2020 |

(Continued)

OTHER PUBLICATIONS

CN110535555 ( See translation), Mar. 2019.*
(Continued)

*Primary Examiner* — Dang T Ton
(74) *Attorney, Agent, or Firm* — Sterne, Kessler, Goldstein & Fox P.L.L.C.

(57) ABSTRACT

Aspects are described for a user equipment (UE) comprising a transceiver configured to enable wireless communication with a base station and a processor communicatively coupled to the transceiver. The processor is configured to determine one or more configured grant (CG) transport blocks (TBs) of one or more CG uplink transmissions and determine one or more dynamic grant (DG) TBs of one or more DG uplink transmissions. The processor is further configured to determine that a first CG TB of the one or more CG TBs overlaps with a first DG TB of the one or more DG TBs in time and determine that a priority level of the first CG TB is lower than a priority level of the DG TB. The processor is further configured to determine that the priority
(Continued)

level of the first CG TB is lower than the priority level of the first DG TB and transmit, in the first DG TB, a first DG uplink transmission corresponding to the first DG TB.

20 Claims, 10 Drawing Sheets

(58) Field of Classification Search
USPC .............................. 370/329, 401, 402, 403
See application file for complete search history.

(56) References Cited

FOREIGN PATENT DOCUMENTS

| | | | |
|---|---|---|---|
| CN | 111385070 A | 7/2020 | |
| WO | WO-2015116866 A1 * | 8/2015 | .......... H04W 52/146 |

OTHER PUBLICATIONS

CN111385070 ( See translation), Jul. 2020.*
International Search Report and Written Opinion of the International Searching Authority directed to related International Patent Application No. PCT/CN2021/110913, mailed Apr. 25, 2022; 9 pages.
LG Electronics: "Discussion on resource conflict between PUSCHs," 3GPP Draft; R1-1906670, 3GPP TSG RAN WG1 #97, Reno, USA, May 2019; 4 pages.

* cited by examiner

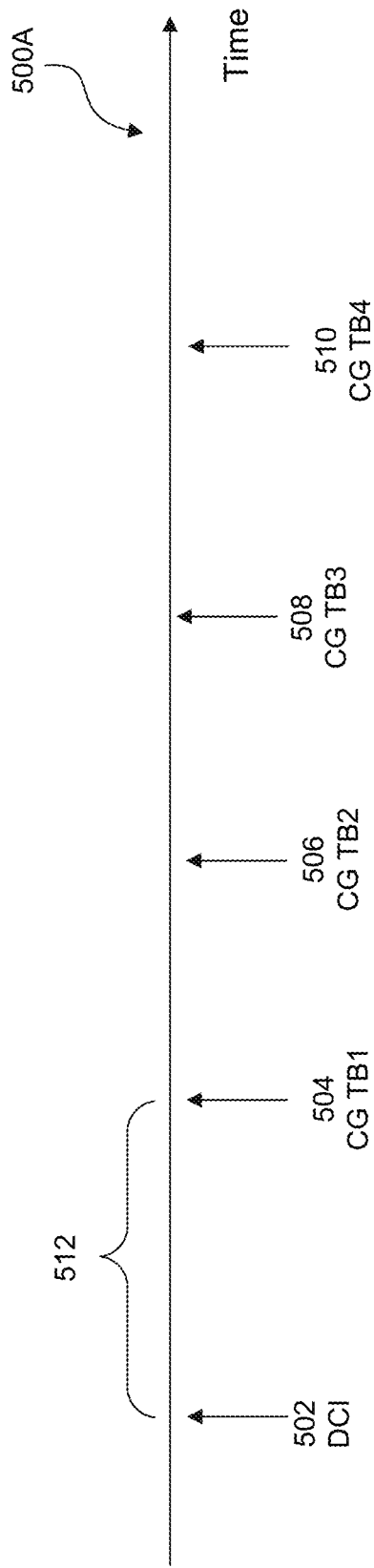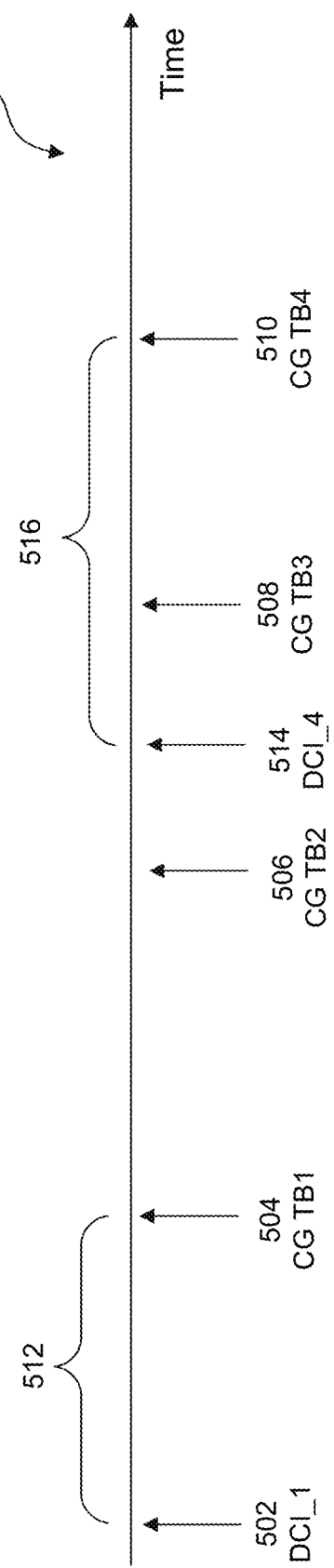
FIG. 5A
FIG. 5B

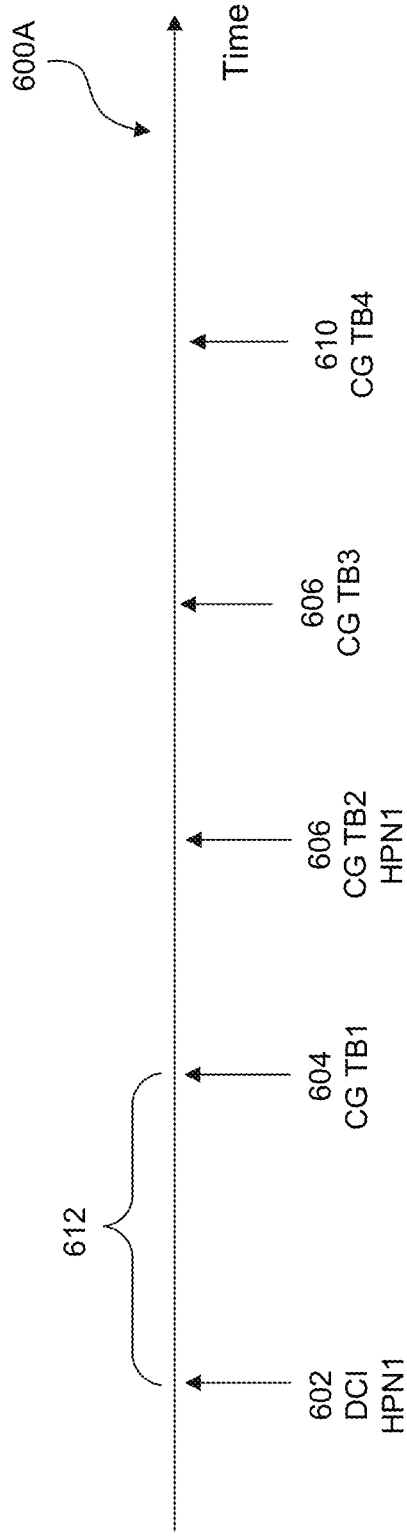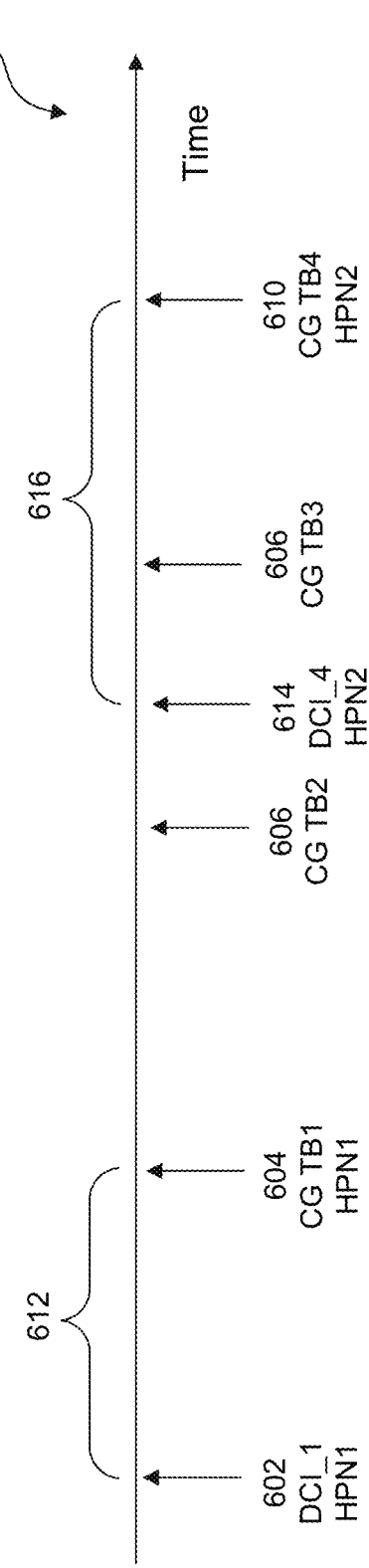
FIG. 6A
FIG. 6B

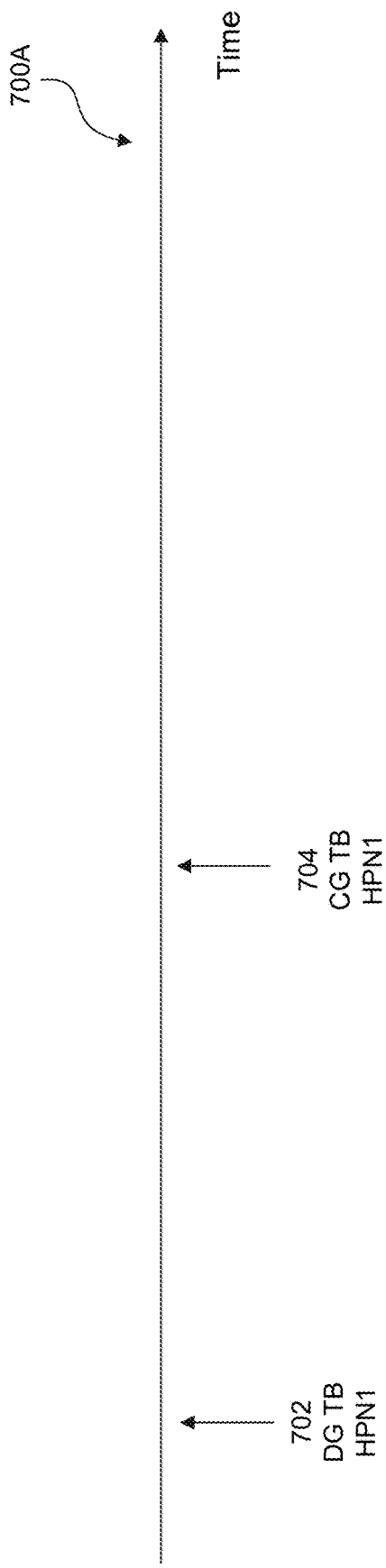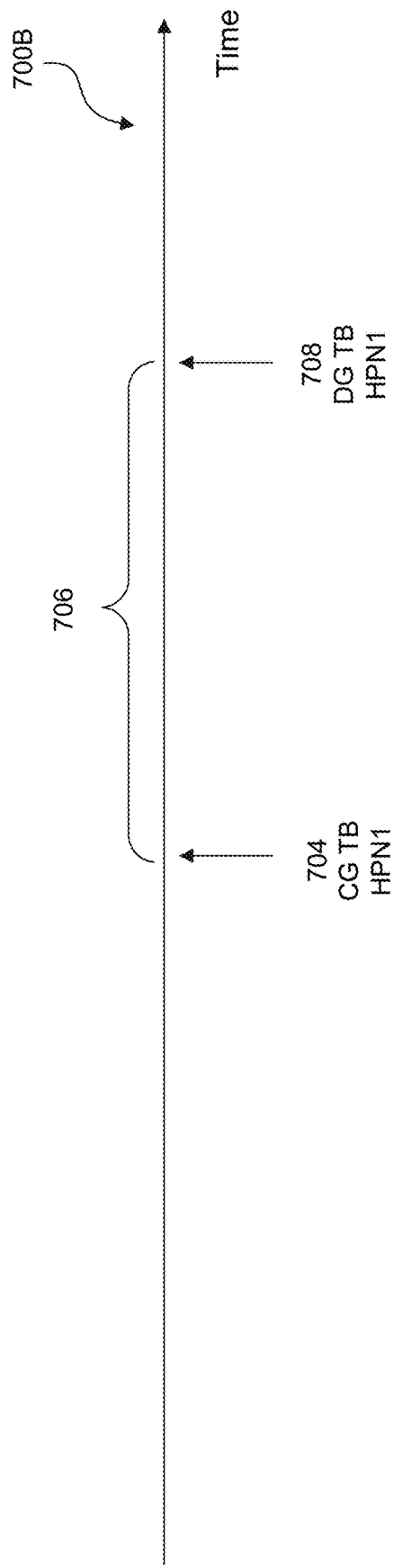

SYSTEM AND METHODS FOR MULTI-PHYSICAL UPLINK SHARED CHANNEL (PUSCH) CONFIGURED GRANT

This application is a U.S. National Phase of International Application No. PCT/CN2021/110913, filed Aug. 5, 2021, which is hereby incorporated by reference in its entirety.

BACKGROUND

Field

The described aspects generally relate to an enhancement on a multi-uplink scheduling of a user equipment (UE).

SUMMARY

Some aspects of this disclosure relate to apparatuses and methods for implementing multi-uplink scheduling of a user equipment (UE). For example, systems and methods are provided for implementing a multi-physical uplink shared channel (PUSCH) scheduling via a configured grant (CG) and a dynamic grant (DG).

Some aspects of this disclosure relate to a UE comprising a transceiver configured to enable wireless communication with a base station and a processor communicatively coupled to the transceiver. The processor is configured to determine one or more CG transport blocks (TBs) of one or more CG uplink transmissions and determine one or more DG TBs of one or more DG uplink transmissions. The processor is further configured to determine that a first CG TB of the one or more CG TBs overlaps with a first DG TB of the one or more DG TBs in time and compare a priority level of the first CG TB and a priority level of the first DG TB. The processor is further configured to determine that the priority level of the first CG TB is lower than the priority level of the first DG TB and transmit, in the first DG TB, a first DG uplink transmission corresponding to the first DG TB.

Some aspects of this disclosure relate to a method of operating a UE. The method comprises determining one or more CG TBs of one or more CG uplink transmissions and determining one or more DG TBs of one or more DG uplink transmissions. The method further comprises determining that a first CG TB of the one or more CG TBs overlaps with a first DG TB of the one or more DG TBs in time and determining that a priority level of the first CG TB is lower than a priority level of the DG TB. The method further comprises transmitting, in the first DG TB, a first DG uplink transmission of the one or more DG uplink transmissions corresponding to the first DG TB.

Some aspects of this disclosure relate to a base station comprising a transceiver configured to enable communication with a UE and a processor communicatively coupled to the transceiver. The processor is configured to generate downlink control information (DCI), wherein the DCI includes a DG TB and a DG hybrid automatic repeat request (HARQ) process number (HPN) of a DG uplink transmission. The processor is further configured to transmit, using the transceiver, the DCI to the UE. The processor is further configured to transmit, using the transceiver, a configuration message to the UE to instruct the UE to transmit the DG uplink transmission in the DG TB by comparing priority levels of the DG TB and a CG TB in response to overlapping between the DG TB and the CG TB corresponding to a CG uplink transmission.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIGS. 5A-5B illustrate examples of downlink control information (DCI) timeline constraints, according to aspects of the disclosure.

FIGS. 6A-6B illustrate examples of the DCI timeline constraints with hybrid automatic repeat request (HARQ) process numbers (HPNs), according to aspects of the disclosure.

FIGS. 7A-7B illustrate examples of timelines for retransmission, according to aspects of the disclosure.

Figure 1:
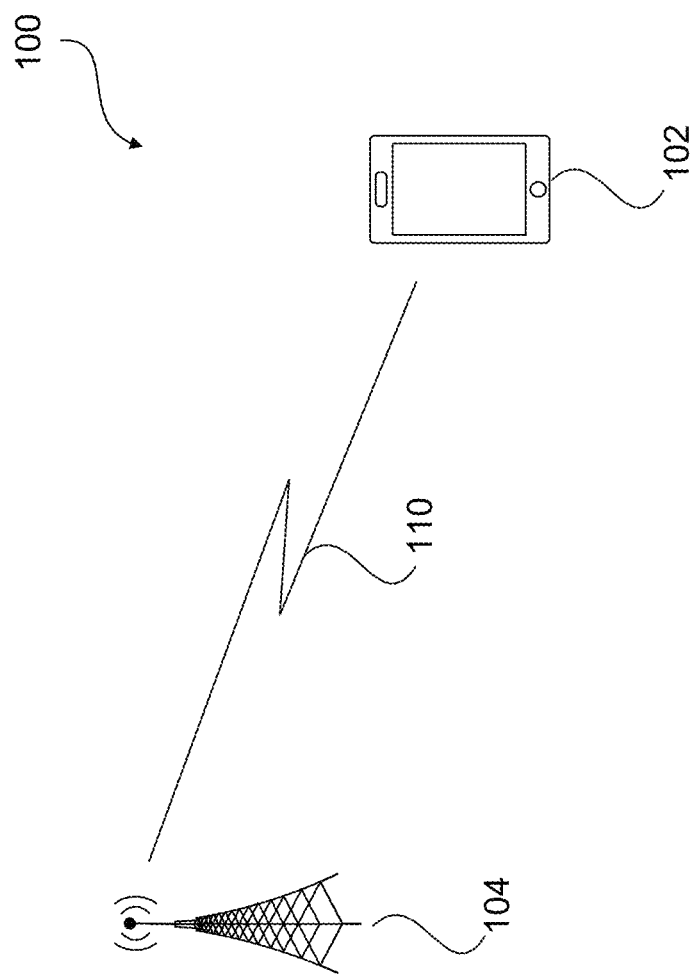
FIG. 1 illustrates an example system implementing multi-uplink scheduling of a user equipment (UE), according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing multi-uplink scheduling of a user equipment (UE). For example, systems and methods are provided for implementing designs for a multi-physical uplink shared channel (PUSCH) scheduling via a configured grant (CG) and a dynamic grant (DG). In some aspects, the CG configures resources for PUSCH transmissions, where the UE transmits the PUSCH transmissions using the resources repeatedly. Whereas, the DG schedules resources for the UE to transmit the PUSCH transmissions on an ad hoc basis, typically one at a time. For example, the UE transmits using one or more resources, such as one or more transport blocks (TBs), for one or more uplink (UL) transmissions, such as PUSCH transmissions. In some aspects, the UE transmits one or more CG UL transmissions, such as one or more CG PUSCH transmissions, based on a CG configuration received from a base station. Specifically, the CG configuration indicates CG TBs for the one or more CG UL transmissions. The UE can repeatedly transmit the CG UL transmissions using the configured resources, such as the CG TBs. For example, the UE periodically transmits the one or more UL transmissions using the one or more CG TBs.

In some aspects, the UE can also transmit one or more DG UL transmissions based on a DG. For example, the UE receives downlink control information (DCI) that includes the DG, wherein the DG indicates one or more resources, such as one or more DG TBs, that correspond to the one or more DG UL transmissions, such as one or more DG PUSCH transmissions.

In some aspects, transmissions of the UE, such as the one or more CG UL transmissions and the one or more DG UL transmissions, are in higher frequencies, such as frequencies above 52.6 GHz. In such a case, the transmissions of the UE suffer from significant phase noise. To reduce the phase noise, the UE increases subcarrier spacing (SCS) of the transmissions. For example, the UE increases the SCS to 120 kHz, 480, kHz, 960 kHz, or the like. Therefore, symbol durations, slot sizes, and/or transmission durations of the UE transmissions decrease proportionally as well. In some aspects, the base station schedules a plurality of UE transmissions in a single message, such as the DCI, to adapt to the reduced transmission durations. For example, the base station schedules the one or more DG UL transmissions in single DCI. In some aspects, the base station can schedule up to 8 DG UL transmissions in the single DCI. In such a case, a number of DCI required for the one or more DG UL transmission is reduced. Accordingly, control channel monitoring complexity that may arise from the reduction in the slot sizes due to the increasing in SCS can be reduced as well.

In some aspects, at least one CG TB of the one or more CG TBs conflicts with at least one DG TB of the one or more DG TBs. For example, the at least one CG TB overlaps with the at least one DG TB entirely or partially in time. In such a case, the UE adjusts the at least one CG TB or the at least one DG TB based on priorities. The UE can cancel or postpone TBs with lower priorities. A UE adjustment behavior can be hard coded. For example, the UE adjustment behavior can be defined by a standard, such as a 3GPP standard, and hard coded in the UE. In some aspects, the UE adjustment behavior can also be configured by the base station. For example, the base station transmits a configuration message to the UE indicating the UE adjustment behavior. The base station can transmit the configuration message via higher level transmissions, such as a radio resource control (RRC) transmission, or dynamically with other transmissions, such as a Medium Access Control—Control Element (MAC-CE) or DCI.

In some aspects, the one or more CG PUSCH and the one or more DG PUSCH conflict in hybrid automatic repeat request (HARQ) process numbers (HPNs). For example, at least one CG PUSCH and at least one DG PUSCH share a same HPN. In such a case, the UE can adjust a HPN of the at least one CG PUSCH or the at least one DG PUSCH. In some aspects, the UE adjusts according to a hard coded initial configuration. For example, the UE's adjustment behavior can be defined by a standard, such as a 3GPP standard, and hard coded in the UE. In other aspects, the base station configures the UE to adjust the HPN. For example, the base station configures the UE via a higher layer transmission, such as an RRC transmission, or dynamically with other transmissions such as an MAC-CE or DCI.

In some aspects, the UE determines whether the DG, such as the DCI, arrives at the UE within a required timeline. For example, the DG is required to arrive at the UE a predetermined period before a beginning of the one or more CG TBs. In other words, a time difference between the DG configuration arrival time and a beginning of an earliest CG TB of the one or more CG TBs needs to be larger than the predetermined period. If the required timeline is satisfied, the UE performs TB adjustments and/or HPN adjustments as described above when necessary. Otherwise, the UE disregards the DG configuration.

FIG. 1 illustrates an example system 100 implementing designs of multi-uplink scheduling of a UE, according to some aspects of the disclosure. Example system 100 is provided for the purpose of illustration only and does not limit the disclosed aspects. System 100 may include, but is not limited to, a UE 102 and a base station 104. The UE 102 may be implemented as electronic devices configured to operate based on a wide variety of wireless communication techniques. These techniques may include, but are not limited to, techniques based on 3rd Generation Partnership Project (3GPP) standards. For example, the UE 102 may include electronic devices configured to operate using one or more 3GPP releases, such as Release 15 (Rel-15), Release 16 (Rel-16), Release 17 (Rel-17), or other 3GPP releases. The UE 102 may include, but is not limited to, wireless communication devices, smartphones, laptops, desktops, tablets, personal assistants, monitors, televisions, wearable devices, Internet of Things (IoT) devices, vehicle communication devices, and the like. The base station 104 may include one or more nodes configured to operate based on a wide variety of wireless communication techniques such as, but not limited to, techniques based on the 3GPP standards. For example, the base station 104 may include nodes configured to operate using Rel-15, Rel-16, Rel-17, or other 3GPP releases. The base station 104 may include, but not limited to, base stations, NodeBs, eNodeBs, gNBs, new radio base stations (NR BSs), access points (APs), remote radio heads, relay stations, and others.

In some aspects, the UE 102 connects with the base station 104 via a communication link 110. The communication link 110 includes UL connections and downlink (DL) connections. In some aspects, the UE 102 transmits one or more UL transmissions via the UL connections of the communication link 110. The one or more UL transmissions include CG UL transmissions and DG UL transmissions. As described above, the CG UL transmissions and the DG UL transmissions may conflict in TBs and HPNs. The UE 102 adjusts the TBs and HPNs to resolve the conflicts. The UE 102 can adjust with various approaches. For example, the UE 102 can adjust the conflicts in TBs by canceling or postponing TBs of the CG UL transmissions. In some aspects, the base station 104 needs to be aware of and in agreement with the approaches performed by the UE 102. For example, the UE 102 postpones a TB corresponding to a CG UL transmission. In response, the base station 104 can also postpone a time of receiving the CG UL transmission accordingly. In other words, the UE 102 and the base station 104 are coordinated in postponing a transmission and postponing a receiving.

In some aspects, the approaches performed by the UE 102 can be consistent with a standard, such as a 3GPP standard, and hardcoded in the UE 102. Because the base station 104 also follows the standard, the base station 104 can predict behaviors of the UE 102 based on the standard and coordinate with the UE 102. In some aspects, the base station 104 configures the UE 102 semi-persistently. For example, the base station 104 transmits a configuration message, via the DL connections of the communication link 110, to the UE 102. The configuration message indicates an approach of the UE 102 to resolve the conflicts between the CG UL transmissions and the DG UL transmissions. The UE 102 adopts the approach indicated in the configurations message until a new configuration message is received from the base station 104. In other aspects, the base station 104 configures the UE 102 dynamically. For example, the base station 104 transmits a DG via DL transmissions, such as DCI, to the UE 102 to transmit the DG UL transmissions. The DG can also indicate an approach of the UE 102 to resolve the conflicts involving the DG UL transmissions identified by the DG.

In some aspects, a UL transmission, such as the CG UL transmission and the DG UL transmissions, requires retransmission. The base station 104 may determine that signal qualities of the UL transmission received from the UE 102 are below a threshold. For example, the base station 104 determines that a received signal power of the UL transmission is below a power threshold. For another example, a bit error rate (BER) of the UL transmission is below a BER threshold. In such a case, the base station 104 transmits a request for retransmission to the UE 102 via the communication link 110. In some aspects, the UE 102 waits a retransmission round trip period to retransmit. For example, the retransmission round trip period can be a period that is larger than a round trip time (RRT) between the UE 102 and the base station 104. For another example, the retransmission round trip period includes a UL transmission time for the UL transmission to travel from the UE 102 to the base station 104, a processing time for the base station 104 to process the UL transmission and determine for a retransmission, and a DL transmission time for the request for retransmission to travel from the base station 104 to the UE 102. In some aspects, the UE 102 determines that the UL transmission is successful if the UE 102 does not receive the request for retransmission after the retransmission round trip period. In some aspects, the base station 104 determines the retransmission round trip period and notifies it to the UE 102. The retransmission round trip period can also be defined in a standard, such as a 3GPP standard.

Figure 2:
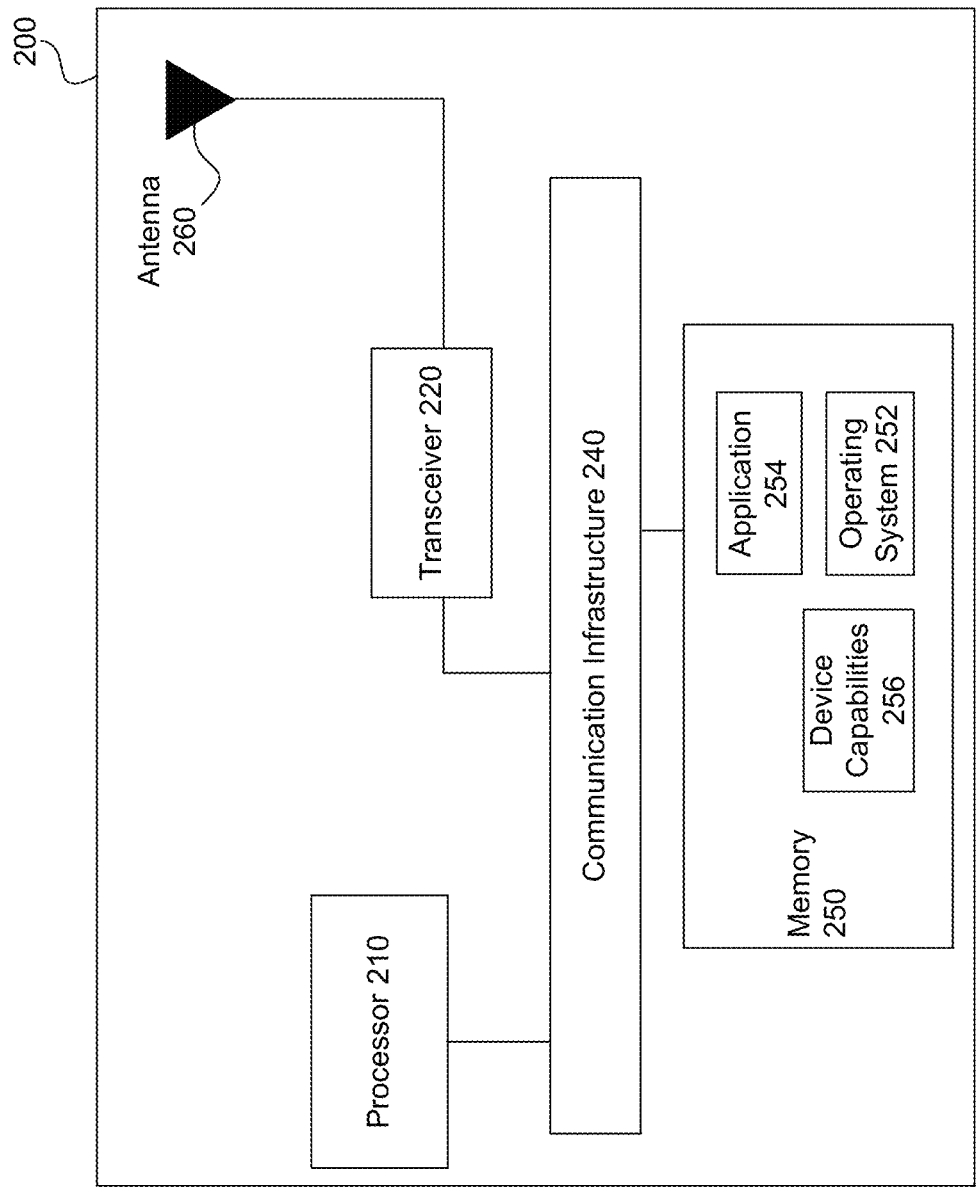
FIG. 2 illustrates a block diagram of an example system of an electronic device for the multi-uplink scheduling, according to some aspects of the disclosure.

FIG. 2 illustrates a block diagram of an example system 200 of an electronic device implementing multi-uplink scheduling of a UE, according to some aspects of the disclosure. The system 200 may be any of the electronic devices (e.g., the UE 102 and the base station 104) of the system 100. The system 200 includes a processor 210, one or more transceivers 220, a communication infrastructure 240, a memory 250, an operating system 252, an application 254, device capabilities 256, and one or more antennas 260. Illustrated systems are provided as exemplary parts of system 200, and system 200 may include other circuit(s) and subsystem(s). Also, although the systems of system 200 are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by wireless system 200 and/or a user of wireless system 200. The applications in the application 254 may include applications such as, but not limited to, Siri™, FaceTime™, radio streaming, video streaming, remote control, and/or other user applications. In some aspects, the device capabilities 256 may be stored in the memory 250. For example, the device capabilities 256 include computational complexity capabilities, processing speed, and other capabilities.

The system 200 may also include the communication infrastructure 240. The communication infrastructure 240 provides communication between, for example, the processor 210, the one or more transceivers 220, and the memory 250. In some implementations, the communication infrastructure 240 may be a bus.

The processor 210, alone, or together with instructions stored in the memory 250 performs operations enabling system 200 of the system 100 to implement mechanisms for the multi-uplink scheduling, as described herein. Alternatively, or additionally, the processor 210 can be "hard coded" to implement mechanisms for the multi-uplink scheduling, as described herein The one or more transceivers 220 transmit and receive communications signals support mechanisms for the multi-uplink scheduling. Additionally, the one or more transceivers 220 transmit and receive communications signals that support mechanisms for measuring communication link(s), generating and transmitting system information, and receiving the system information. According to some aspects, the one or more transceivers 220 may be coupled to antenna 260 to wirelessly transmit and receive the communication signals. Antenna 260 may include one or more antennas that may be the same or different types. The one or more transceivers 220 allow system 200 to communicate with other devices that may be wired and/or wireless. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver.

Additionally, the one or more the transceivers 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the one or more transceivers 220 may be configured to operate according to one or more of Rel-15, Rel-16, Rel-17, or other releases of 3GPP standard.

As discussed in more detail below with respect to FIGS. 3-8, processor 210 may implement different mechanisms for the multi-uplink scheduling as discussed with respect to the system 100 of FIG. 1.

Figure 3:
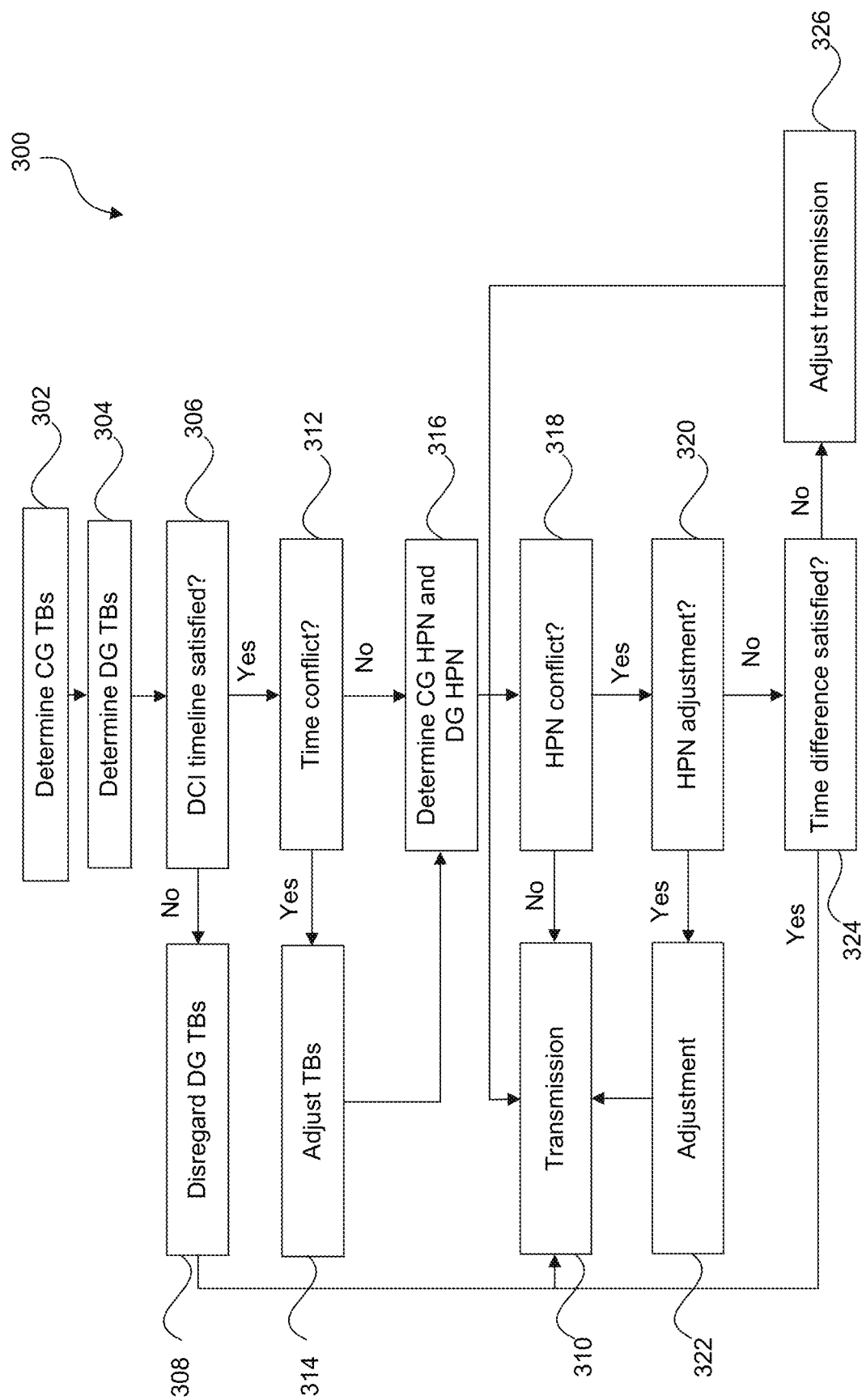
FIG. 3 illustrates an example method for a multi-physical uplink shared channel (PUSCH) scheduling via a configured grant (CG) and a dynamic grant (DG), according to aspects of the disclosure.

FIG. 3 illustrates an example method 300 for multi-PUSCH scheduling via a CG and a DG. As a convenience and not a limitation, FIG. 3 may be described with regard to elements of FIGS. 1, 2, and 9. Method 300 may represent the operation of electronic devices (for example, the UE 102 and the base station 104 of FIG. 1) implementing the multi-PUSCH scheduling. The example method 300 may also be performed by system 200 of FIG. 2, controlled or implemented by processor 210, and/or computer system 900 of FIG. 9. But method 300 is not limited to the specific aspects depicted in those figures and other systems may be used to perform the method, as will be understood by those skilled in the art. It is to be appreciated that not all operations may be needed, and the operations may not be performed in the same order as shown in FIG. 3.

At 302, the UE 102 determines one or more CG TBs corresponding to one or more CG PUSCH transmissions. In some aspects, each of the one or more CG TBs corresponds to one of the one of more CG PUSCH transmissions. The UE 102 can determine the one or more CG TBs based on a CG configuration message received from the base station 104 previously. In some aspects, the one or more CG PUSCH transmissions form a CG PUSCH transmission group. Similarly, the one or more CG TBs form a CG TB group.

At 304, the UE 102 determines one or more DG TBs corresponding to one or more DG PUSCH transmissions. In some aspects, each of the one or more DG TBs corresponds to one of the one or more DG PUSCH transmissions. The UE 102 can determine the one or more DG TBs based on a DG received from the base station 104, such as DCI. For example, the DCI can be in a DCI format 0_1 or a DCI format 1_1.

At 306, the UE 102 determines whether a DCI timeline requirement is satisfied. For example, the UE 102 determines whether the UE 102 has enough time to adjust the one or more CG PUSCH transmissions if there are conflicts between the one or more CG PUSCH transmissions and the one or more DG PUSCH transmissions. More specifically, the UE 102 determines whether the DCI arrives too later to be considered by the UE 102. More details are described in FIGS. 5A and 5B below. If the UE 102 determines that the DCI timeline requirement is not satisfied, the control moves to 308.

At 308, the UE 102 disregard the DG TBs. For example, the UE 102 cancels the one or more DG PUSCH transmissions.

At 310, the UE 102 performs transmissions. In some aspects, if the UE 102 disregards the DG TBs, the UE 102 transmits the one or more CG PUSCH transmissions in the one or more CG TBs.

Referring back to 306, if the UE 102 determines that the DCI timeline is satisfied, the control moves to 312.

At 312, the UE 102 determines whether there is a time conflict. In some aspects, the UE 102 determines whether the one or more CG TBs overlap with the one or more DG TBs. More details are described below in FIG. 4A. If the UE 102 determines that there is a time conflict, the control moves to 314.

At 314, the UE 102 adjusts TBs. For example, the UE 102 adjusts the one or more CG TBs or the one or more DG TBs based on priorities. For example, the UE 102 compares priorities of the one or more CG TBs or the one or more DG TBs and adjusts based on a result of the comparison. In addition, the UE 102 can adjust the TBs by canceling the TBs or postponing the TBs. More details are described below in FIGS. 4B-4D. After adjusting the TBs, the control moves to 316.

Referring back to 312, if the UE 102 determines that there is no time conflict, the control moves directly to 316.

At 316, the UE 102 determines one or more CG HPNs and one or more DG HPNs. In some aspects, the one or more CG HPNs correspond to the one or more CG PUSCH transmissions. In other words, each CG PUSCH transmission of the one or more CG PUSCH transmission corresponds to a CG TB and a CG HPN. Similarly, each DG PUSCH transmission of the one or more DG PUSCH transmission corresponds to a DG TB and a DG HPN.

In some aspects, the UE 102 determines the one or more CG HPNs based on predetermined parameters and timing parameters. For example, the predetermined parameters include a periodicity of the one or more TBs, a modulo number of a HARQ process, and so on. The timing parameters include a slot number of the one or more TBs, a current symbol number of the one or more TBs, and so on. In other words, the UE 102 determines the one or more CG HPNs based on local information available to the UE 102.

On the other hand, the UE 102 determines the one or more DG HPNs based on the DG received from the base station 104, such as the DCI. For example, the DG indicates an initial DG HPN corresponding to the DG PUSCH transmission group that includes the one or more DG PUSCH transmissions. The UE 102 determines the one or more HPNs based on the initial DG HPN. For example, the UE 102 assigns the initial DG HPN to a top DG PUSCH transmission of the DG PUSCH transmission group, wherein the top DG PUSCH transmission is scheduled to transmit earlier than any other DG PUSCH transmissions in the DG PUSCH transmission group. The UE 102 then determines a second DG HPN by incrementing the initial DG HPN by 1 and assigns the second DG HPN to a DG PUSCH transmission that follows the top DG PUSCH transmission. The process continues until the UE 102 assigns the one or more DG HPN to the one or more DG PUSCH transmissions in the DG PUSCH transmission group.

At 318, the UE 102 determines whether there is an HPN conflict between the one or more CG HPNs and the one or more DG HPNs. For example, the UE 102 may determine that a CG HPN is identical to a DG HPN. In such a case, the UE 102 also determines whether a DCI timeline requirement is satisfied considering an HPN conflict. For example, if the DCI arrives at the UE 102 too late, the UE 102 refuses to resolve the HPN conflict caused by the one or more DG HPNs indicated by the DCI. More details are described in FIGS. 6A and 6B. In such a case, the UE 102 disregards the one or more DG HPNs and determines that there is no HPN conflict. In some aspects, the UE 102 determines that the DCI time line requirement is satisfied considering the HPN conflict and the CG HPN is identical to the DG HPN. In such as case, the UE 102 determines whether there is an HPN conflict based on a time distance between the conflicting HPNs. For example, the CG HPN corresponds to a CG TB and the DG HPN corresponds to a DG TB. If a time difference between the CG TB and the DG TB is greater than a predetermined period, such as a retransmission round trip period described in FIG. 1, the UE 102 determines that there is no HPN conflict. In other words, the conflicting CG HPN and DG HPN are too far from each other to interfere with each other. Otherwise, if the time difference between the CG TB and the DG TB is smaller than the predetermined period, the UE 102 determines that there is an HPN conflict.

On the other hand, the UE 102 may also determine that there is no HPN conflict because the one or more CG HPNs and the one or more DG HPNs are different. If the UE 102 determines that there is no HPN conflict, either because the UE 102 disregards the one or more DG HPNs, the conflicting HPNs are too far away from each other, or there is no identical HPN in the first place, the control moves to 310.

At 310, the UE 102 performs transmissions. If the UE 102 determines that there is no HPN conflict based on the non-existence of identical HPN in 318, the UE 102 transmits the one or more CG PUSCH transmissions in the one or more CG TBs and transmits the one or more DG PUSCH transmissions in the one or more DG TBs. If the UE 102 determines that there is no HPN conflict by disregarding the one or more DG HPNs, the UE 102 transmits the one or more CG PUSCH transmissions in the one or more CG TBs, but not the one or more DG PUSCH transmissions.

Referring back to 318, if the UE 102 determines that there is an HPN conflict, the control moves to 320.

At 320, the UE 102 determines whether to adjust HPNs. In some aspects, the UE 102 can resolve the HPN conflict by adjusting the HPNs, such as the one or more DG HPNs, or by adjusting TBs, such as the one or more CG TBs without adjusting the HPNs. The UE 102 can determine whether to adjust HPNs based on a standard, such as a 3GPP standard. In such a case, the UE 102 takes an approach that is predefined and hard coded in the UE 102. The base station 104 can therefore predict the approach of the UE 102 based on the standard. The UE 102 can also determine based on instructions of the base station 104. For example, the base station 104 transmits a configuration message to the UE 102 indicating whether to adjust the HPNs. In some aspects, the base station 104 transmits the configuration message via a higher layer transmission, such as an RRC transmission, or dynamically with other transmissions, such as an MAC-CE or DCI. If the UE 102 determines to adjust the HPNs, the control moves to 322.

At 322, the UE 102 can adjust the one or more DG HPNs by skipping the overlapping HPNs. For example, the one or more CG HPNs includes "3." The initial DG HPN is "1" and the DG PUSCH transmission group includes four DG PUSCH transmissions. As described above, the UE 102 determines that the one or more DG HPNs to be "1," "2," "3," and "4" by incrementing from the initial DG HPN. Because both the one or more CG HPNs and the one or more DG HPNs include "3," the UE 102 skips "3" in the one or more DG HPNs to resolve the conflict. Therefore, the UE 102 adjusts the one or more DG HPNs to "1," "2," "4," and "5." In some aspects, the one or more CG HPNs include a plurality of HPNs that conflict with the one or more DG HPNs, in such a case, the UE 102 adjusts the one or more DG HPNs to skip all the conflicting HPNs.

In some aspects, the UE 102 predetermines a HPN conflict before assigning the one or more DG HPNs and adjusts the initial DG HPN. For example, the one or more CG HPNs includes "3." The initial DG HPN is "1" and the DG PUSCH transmission group includes four DG PUSCH transmissions. The UE 102 predetermines that assigning the one or more DG HPNs based on the initial DG HPN would cause the HPN conflict. In such as case, the UE 102 adjusts the initial DG HPN to be "4." In such a case, the UE 102 determines the one or more DG HPNs to be "5," "6," "7," and "8," to avoid the HPN conflict. In some aspects, the one or more CG HPNs include a plurality of HPNs, the UE 102 adjusts the initial DG HPN based on one or more gaps between the one or more CG HPNs. For example, the one or more CG HPNs include "3" and "5," and the initial DG HPN is still "1." In such as case, the gap between "3" and "5" is only one number, and the one or more DG HPNs does not fit in the gap. The UE 102 then adjusts the initial DG HPN to be "6." On the other hand, if the one or more CG HPNs have a gap that is big enough for the one or more DG HPNs, the UE 102 can place the one or more DG HPNs in the gap. For example, the one or more DG HPNs include "3" and "8," and the initial DG HPN is still "1." The UE 102 can adjust the initial DG HPN to be "4." In such a case, the UE 102 determines the one or more DG HPNs to be "4," "5," "6," and "7."

In some aspects, the UE 102 can also adjust the one or more CG HPNs. For example, the one or more CG HPNs includes "3," and the initial DG HPN is "1." In such a case, the UE 102 determines that the one or more DG HPNs also include "3," which conflicts the one or more CG HPNs. The UE can adjust the one or more CG HPNs to be one or more numbers that are different from the one or more DG HPNs. In some aspects, the UE adjusts the one or more CG HPNs to be one or more numbers that follows the one or more DG HPNs. For example, if the one or more DG HPNs includes "1," "2," "3," and "4," the UE 102 can adjust the one or more CG HPNs to be "5." In some aspects, the UE 102 determines whether to adjust the one or more DG HPNs or the one or more CG HPNs based on priorities. For example, if the one or more DG HPNs have higher priorities, the UE 102 adjusts the one or more CG HPNs.

After adjusting the one or more DG HPNs, the control moves to 310. At 310, the UE 102 transmits the one or more CG PUSCH transmissions in the one or more CG TBs and transmits the one or more DG PUSCH transmissions in the one or more DG TBs.

Referring back to 320, if the UE 102 determines not to adjust the HPNs, the control moves to 324.

At 324, the UE 102 determines whether a time difference requirement is satisfied between conflicting HPNs. For example, a first CG PUSCH transmission of the CG PUSCH transmission group shares a same HPN with a first DG PUSCH transmission of the DG PUSCH transmission group. The first CG PUSCH transmission and the first DG PUSCH transmission correspond to a first CG TB and a first DG TB, respectively. The UE 102 determines that the time difference requirement is satisfied if a time difference between the first CG TB and the first DG TB is larger than a retransmission round trip period. More details are discussed in FIGS. 7A and 7B below. In such a case, the control moves to 310 and the UE 102 transmits the one or more CG PUSCH transmissions in the one or more CG TBs and transmits the one or more DG PUSCH transmissions in the one or more DG TBs. If the UE 102 determines that the time difference requirement is no satisfied, the control moves to 326.

At 326, the UE 102 adjust transmissions. For example, the UE 102 determines whether to cancel the first CG PUSCH transmission or the first DG PUSCH transmission based on priorities. The UE 102 can also determine whether to cancel the first CG PUSCH transmission or the first DG PUSCH transmission based on the first CG TB and the first DG TB. More details are discussed in FIGS. 7A and 7B below.

Figure 4A:
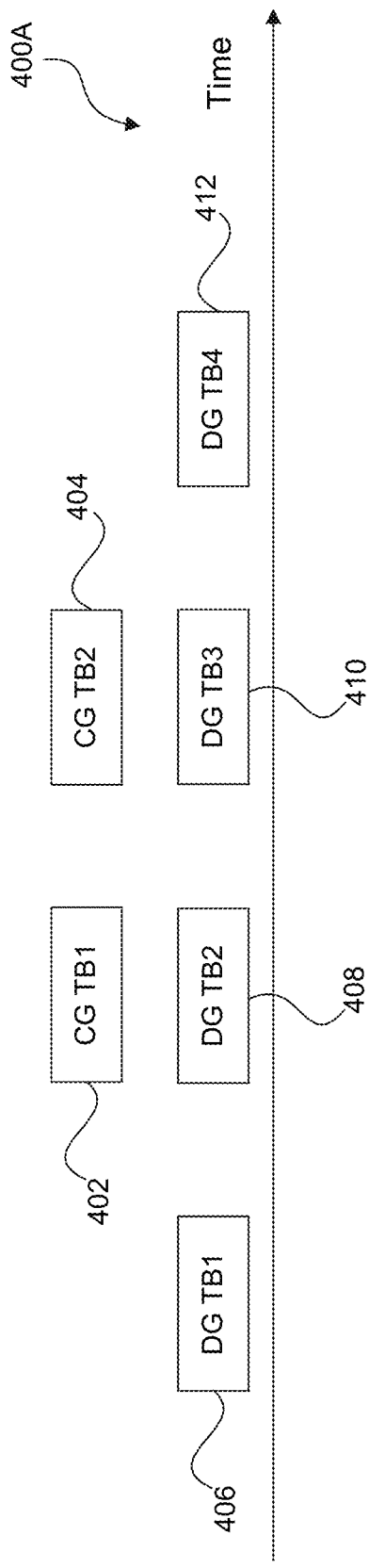
FIGS. 4A-4D illustrate examples of conflicts in time between a CG uplink transmission and a DG uplink transmission, according to aspects of the disclosure.

FIG. 4A illustrates an example 400A of conflicts in time between a CG uplink transmission and a DG uplink transmission, as described in 312 of FIG. 3. Example 400A is provided for the purpose of illustration only and does not limit the disclosed aspects. Example 400A includes a CG TB1 402 and a CG TB2 404. In some aspects, the CG TB1 402 and the CG TB2 404 correspond to CG PUSCH transmissions in a CG PUSCH transmission group. Example 400A also includes a DG TB1 406, and a DG TB2 408, a DG TB3 410, and a DG TB4 412. In some aspects, the DG TB1 406, the DG TB2 408, the DG TB3 410, and the DG TB4 412 correspond to DG PUSCH transmissions in a DG PUSCH transmission group.

According to some aspects, the CG TB1 402 overlaps with the DG TB2 408 partially or completely. The CG TB2 404 overlaps with the DG TB3 410 partially or completely. Therefore, the UE 102 determines that there is a time conflict between the CG PUSCH transmission group and the DG PUSCH transmission group.

In some aspects, the UE 102 can determine a time conflict when only one CG TB is configured to be transmitted. For example, if the only CG TB1 402 is configured to be transmitted for the CG PUSCH transmission group, the UE 102 determines that there is a time conflict because the CG TB1 402 conflicts with the DG TB2 408. In other aspects, the UE 102 can determine a time conflict when only one DG TB is scheduled. For example, if the only DG TB2 408 is scheduled for the DG PUSCH transmission group, the UE 102 determines that there is a time conflict because the CG TB1 402 conflicts with the DG TB2 408.

Figure 4B:
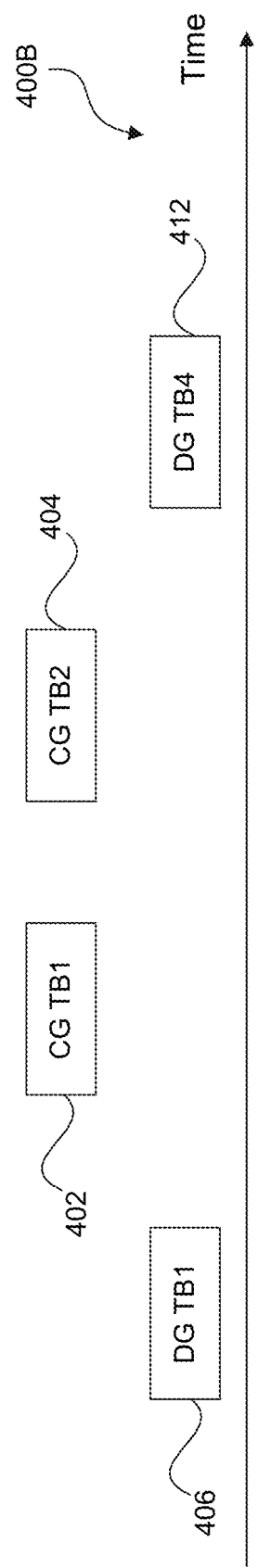

FIG. 4B illustrates an example 400B of the conflicts in time between the CG uplink transmission and the DG uplink transmission, as described in 314 of FIG. 3. Specifically, example 400B describes canceling TBs based on priorities. In some aspects, the UE 102 compares priorities of conflicting TBs. For example, the UE 102 compares priorities between the CG TB1 402 and the DG TB2 408 and priorities between the CG TB2 404 and the DG TB3 410. The UE 102 may determine that the priorities of the CG TB1 402 and the CG TB2 404 are higher than priorities of the DG TB2 408 and the DG TB3 310, shown in FIG. 4A, respectively. To resolve the time conflicts, the UE 102 cancels transmissions with lower priorities. Therefore, as shown in FIG. 4B, the UE 102 cancels the DG TB2 408 and the DG TB3 410 because they have lower priorities. In other words, the UE 102 transmits the DG TB1 406, the CG TB1 402, the CG TB2 404, and the DG TB4 412 in order. On the other hand, if the UE 102 determines that the priorities of the CG TB1 402 and the CG TB2 404 are lower than the priorities of the DG TB2 408 and the DG TB3 410, respectively, the UE 102 cancels CG TB1 402 and CG TB2 404 instead.

In some aspects, the UE 102 determines the priorities of based on instructions from the base station 104. For example, the base station 104 transmits the DCI to the UE 102, wherein the DCI identifies one or more DG TBs, such as the DG TB1 406, the DG TB2 408, the DG TB3 410, and the DG TB4 412 shown in FIG. 4A, and corresponding priority levels. For another example, the base station 104 transmits a CG configuration to the UE 102, wherein the CG configuration identifies one or more CG TBs, such as the CG TB1 402 and the CG TB2 404, and corresponding priority levels. In some aspects, the base station 104 transmits activation DCI to the UE 102 to active the one or more CG TBs. The activation DCI can also indicate the priority levels of the one or more CG TBs.

In some aspects, the UE 102 determines the priority levels based on types of traffic or types of transmissions corresponding to the TBs. For example, the UE 102 may presume that the one or more DG TBs have higher priorities than the one or more CG TBs. This is because the base station 104 dynamically schedules the one or more DG TBs anticipating potential time conflicts with the one or more CG TBs. In other words, the base station 104 schedules the one or more DG TBs to overwrite the one or more CG TBs that are previously configured.

Figure 4C:
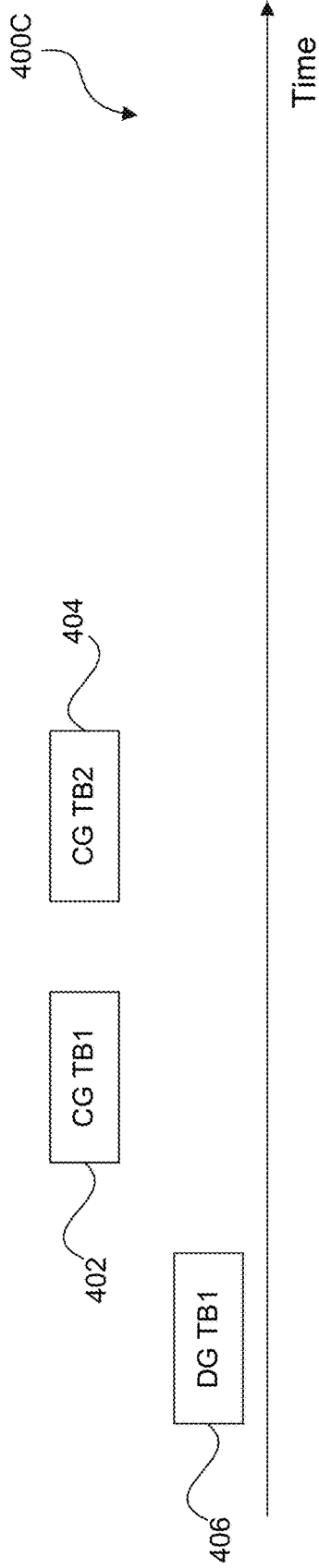

FIG. 4C illustrates an example 400C of the conflicts in time between the CG uplink transmission and the DG uplink transmission, as described in 314 of FIG. 3. Specifically, example 400C describes another example of canceling TBs based on priorities. In some aspects, the UE 102 determines that a first conflict in time between the CG PUSCH transmission group and the DG transmission group is between the CG TB1 402 and the DG TB2 408, shown in FIG. 4A. The UE 102 determines to cancel all TBs following the CG TB1 402 or the DG TB2 408 based on priorities. For example, the UE 102 compares priorities and determines that the priority of the CG TB1 402 is higher than the priority of the DG TB2 408. In such a case, the UE 102 transmits the CG TB1 402 and the CG TB2 404. The UE 102 further cancels the DG TB2 408 as well as the DG TB3 410 and the DG TB4 412 that follow the DG TB2 408. In addition, the UE 102 cancels regardless of the priority of the DG TB3 410. For example, the priority of the DG TB3 410 may be higher than the CG TB2 404. However, the UE 102 does not compare the priorities between the DG TB3 410 and the CG TB2 404 in this case. In other words, the UE 102 only compares priorities once at the first conflict in time and cancels remaining TBs of a PUSCH transmission group, such as the DG transmission group. It is also worth noting that the UE 102 cancels the DG TB4 412 even though it does not conflict with another TB. In summary, the UE 102 transmits the DG TB1 406, the CG TB1 402, and the CG TB2 404 in order.

On the other hand, the UE 102 may determine that the priority of the CG TB1 402 is lower than the priority of the DG TB2 408. In such a case, the UE 102 cancels the CG TB1 402 and the CG TB2 404 that follows the CG TB1 402. In this case, the UE 102 transmits the DG TB1 406, the DG TB2 408, the DG TB3 410, and the DG TB4 412 in order.

Figure 4D:
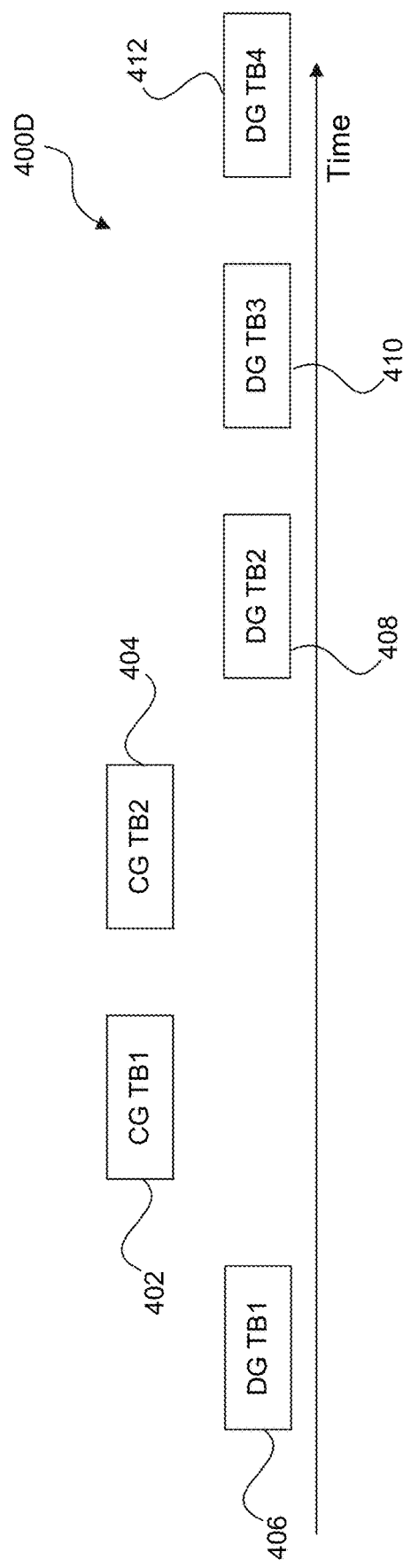

FIG. 4D illustrates an example 400D of conflicts in time between the CG uplink transmission and the DG uplink transmission, as described in 314 of FIG. 3. Specifically, example 400C describes an example of postponing TBs based on priorities. In some aspects, the UE 102 compares priorities and determines that the priorities of the CG TB1 402 and the CG TB2 404 are higher than priorities of the DG TB2 408 and the DG TB3 410, respectively. The UE 102 postpones (e.g. time shifts) the DG TB2 408, DG TB3 410, and the DG TB4 412 by two TBs. In some aspects, TBs are postponed to time locations that are previously scheduled. For example, the DG TB2 408 is postponed to a time location of the DG TB4 412 shown in FIG. 4A. In summary, the UE 102 transmits the DG TB1 406, the CG TB1 402, the CG TB2 404, the DG TB2 408, the DG TB3 410, and the DG TB4 412 in order.

FIG. 5A illustrates an example 500A of DCI timeline constraints, as described in 306 of FIG. 3. Example 500A is provided for the purpose of illustration only and does not limit the disclosed aspects. Example 500A includes a DCI transmission time 502, a CG TB1 504, a CG TB2 506, a CG TB3 508, and a CG TB4 510. In some aspects, the CG TB1 504, the CG TB2 506, the CG TB3 508, and the CG TB4 510 correspond to CG PUSCH transmissions of a CG PUSCH transmission group. The base station 104 transmits DCI in the DCI transmission time 502 to schedule DG PUSCH transmissions of a DG PUSCH transmission group. A period 512 is a time difference between an end of the DCI transmission time 502 and a beginning of the CG TB1 504, which is an earliest TB of the CG PUSCH transmission group. In other words, the period 512 is a time difference between the end of the DCI transmission time 502 and a beginning of the CG PUSCH transmission group. The UE 102 determines whether the DCI timeline is satisfied based on the period 512. For example, if the period 512 is larger than a predetermined period, the UE 102 determines that the DCI timeline is satisfied. Otherwise, the UE 102 determines that the DCI timeline is not satisfied.

In some aspects, the predetermined period depends on processing capabilities of the UE 102. Furthermore, the predetermined period can also depend on UE behaviors of resolving time conflicts described in 314 of FIG. 3. For example, the predetermined period is longer if the UE 102 postpones TBs based on priorities, as described in FIG. 4D. On the other hand, the predetermined period is shorter if the UE 102 compares only the first time conflict as described in FIG. 4C.

FIG. 5B illustrates an example 500B of the DCI timeline constraints, as described in 306 of FIG. 3. Example 500B is provided for the purpose of illustration only and does not limit the disclosed aspects. Example 500B includes a DCI_1 transmission time 502, a CG TB1 504, a CG TB2 506, a CG TB3 508, a CG TB4 510, and a DCI_4 transmission time 514. In some aspects, the base station 104 transmits DCI_1 in the DCI_1 transmission time 502 to schedule a first DG TB that conflicts with the CG TB1 504. In such a case, the UE 102 determines whether the DCI timeline requirement is satisfied based on the period 512, which is a time difference between an end of the DCI_1 transmission time 502 and a beginning of the CG TB1 504. Similar to FIG. 500A, the UE 102 determines that the DCI timeline requirement of the DCI_1 is satisfied if the period 512 is larger than a first predetermined period. In addition, the base station 104 transmits DCI_4 in the DCI_4 transmission time 514 to schedule a second DG TB that conflicts with the CG TB4 510. The UE 102 also determines whether the DCI timeline requirement of the DCI_4 is satisfied based on the period 516, which is a time difference between an end of the DCI_4 transmission time 514 and a beginning of the CG TB4 510. The UE 102 determines that the DCI timeline requirement is satisfied if the period 516 is larger than a second predetermined period. In other words, the UE 102 determines that the DCI timeline requirements is satisfied as long as a time difference between the DCI transmission and a conflicting CG TB, such as the CG TB4 510 is large enough. More specifically, the UE 102 determines the DCI timeline requirement based on individual CG TBs, not the CG PUSCH transmission group as a whole. In some aspects, similar to FIG. 5A, the first and the second predetermined periods depend on processing capabilities of the UE 102 as well as the UE behaviors of resolving time conflicts. The first and the second predetermined periods can be different or the same.

FIG. 6A illustrates an example 600A of DCI timeline constraints with HPNs, as described in 318 of FIG. 3. Example 600A is provided for the purpose of illustration only and does not limit the disclosed aspects. Example 600A includes a DCI transmission time 602, a CG TB1 604, a CG TB2 606, a CG TB3 608, and a CG TB4 610. In some aspects, the CG TB1 604, the CG TB2 606, the CG TB3 608, and the CG TB4 610 correspond to CG PUSCH transmissions of a CG PUSCH transmission group. The base station 104 transmits DCI in the DCI transmission time 602 to schedule a DG PUSCH transmission with an HPN1. The UE 102 determines that the CG TB2 606 also corresponds to the HPN1. Therefore, the DG PUSCH transmission scheduled by the DCI transmitted in DCI transmission time 602 and a CG PUSCH transmission scheduled in CG TB2 606 have the same HPN, i.e., HPN1. The UE 102 determines that whether the DCI transmission is early enough for the UE 102 to resolve the HPN conflict. For example, the UE 102 determines based on a period 612 between an end of the DCI transmission time 602 and a beginning of the CG TB1 604, which is also a beginning of the CG PUSCH transmission group. If the period 612 is less than a first predetermined period, the UE 102 refuses to resolve the HPN conflict and disregards the DCI as described in 318 of FIG. 3. If the period 612 is larger than the first predetermined period, the UE 102 proceeds to resolve the conflict as described in 320 of the FIG. 3. In some aspects, the first predetermined period depends on processing capabilities of the UE 102 as well as UE behaviors of resolving HPN conflicts, as described in 320 of FIG. 3.

FIG. 6B illustrates an example 600B of the DCI timeline constraints with HPNs, as described in 318 of FIG. 3. Example 600B is provided for the purpose of illustration only and does not limit the disclosed aspects. Example 600B includes a DCI transmission time 602, a CG TB1 604, a CG TB2 606, a CG TB3 608, a CG TB4 610, and a DCI transmission 614. In some aspects, the CG TB1 604, the CG TB2 606, the CG TB3 608, and the CG TB4 610 correspond to CG PUSCH transmissions of a CG PUSCH transmission group. The base station 104 transmits first DCI in the DCI transmission time 602 to schedule a first DG PUSCH transmission with an HPN1. The UE 102 determines that the CG TB1 604 also corresponds to the HPN1. Therefore, the first DG PUSCH transmission scheduled by the first DCI transmitted in DCI transmission time 602 and a first CG PUSCH transmission scheduled in CG TB1 604 have the same HPN, i.e., HPN1. The UE 102 determines whether the first DCI transmission is early enough for the UE 102 to resolve the HPN1 conflict. For example, the UE 102 determines based on a period 612 between an end of the DCI transmission time 602 and a beginning of the CG TB1 604. In other words, the period 612 is the time difference between relevant times of the first DG transmission and the first CG transmission. If the period 612 is less than a first predetermined period, the UE 102 refuses to resolve the HPN1 conflict and disregards the first DCI as described in 318 of FIG. 3. If the period 612 is larger than the first predetermined period, the UE 102 proceeds to resolve the conflict as described in 320 of the FIG. 3. In some aspects, the first predetermined period depends on processing capabilities of the UE 102 as well as UE behaviors of resolving HPN conflicts, as described in 320 of FIG. 3.

In some aspects, the base station 104 transmits second DCI in the DCI transmission time 614 to schedule a second DG PUSCH transmission with an HPN2. The UE 102 determines that the CG TB4 610 corresponds to the HPN2. Therefore, the second DG PUSCH transmission scheduled by the second DCI transmitted in DCI transmission time 614 and a second CG PUSCH transmission scheduled in CG TB2 610 have the same HPN, i.e., HPN2. The UE 102 determines whether the second DCI transmission is early enough for the UE 102 to resolve the HPN2 conflict. For example, the UE 102 determines based on a period 616 between an end of the DCI transmission time 614 and a beginning of the CG TB4 610. In other words, the period 616 is the time difference between relevant times of the second DG transmission and the second CG transmission. If the period 616 is less than a second predetermined period, the UE 102 refuses to resolve the HPN2 conflict and disregards the second DCI as described in 318 of FIG. 3. If the period 616 is larger than the second predetermined period, the UE 102 proceeds to resolve the conflict as described in 320 of the FIG. 3. In some aspects, the second predetermined period depends on processing capabilities of the UE 102 as well as UE behaviors of resolving HPN conflicts, as described in 320 of FIG. 3. The first and the second predetermined period can be different or the same.

FIG. 7A illustrates an example 700A of timelines for retransmission, as described in 324 and 326 of FIG. 3. Example 700A is provided for the purpose of illustration only and does not limit the disclosed aspects. In some aspects, the UE 102 is scheduled to transmit a DG PUSCH transmission in a DG TB 702 with HPN1 and is scheduled to transmit a CG PUSCH transmission in a CG TB 704 with HPN1. Therefore, the DG PUSCH transmission and the CG PUSCH transmission have an HPN conflict. As shown in FIG. 7A, the DG TB 702 is earlier than the CG TB 704. In such a case, the UE 102 determines that the time difference requirement is not satisfied, as described in 324 of FIG. 3. The UE 102 further compares priorities of the CG PUSCH transmission and the DG PUSCH transmission to adjust transmissions, as described in 326 of FIG. 3. For example, if the UE 102 determines that a priority of the DG PUSCH transmission is higher than or equal to a priority of the CG PUSCH transmission, the UE 102 cancels the CG PUSCH transmission that is scheduled in the CG TB 704.

FIG. 7B illustrates an example 700B of the timelines for retransmission, as described in 324 and 326 of FIG. 3. Example 700B is provided for the purpose of illustration only and does not limit the disclosed aspects. In some aspects, the UE 102 is scheduled to transmit a DG PUSCH transmission in a DG TB 708 with HPN1 and is scheduled to transmit a CG PUSCH transmission in a CG TB 704 with HPN1. Therefore, the DG PUSCH transmission and the CG PUSCH transmission have an HPN conflict. As shown in FIG. 7B, the DG TB 708 is later than the CG TB 704. In such a case, the UE 102 determines whether the time difference requirement is satisfied, as described in 324 of FIG. 3, based on a period 706 between the CG TB 704 and the DG TB 708. For example, if the period 706 is larger than a retransmission round trip period, as described in FIG. 1, and a priority of the DG PUSCH transmission is higher than or equal to a priority of the CG PUSCH transmission, the UE 102 determines that the time difference requirement is satisfied.

On the other hand, if the UE 102 determines the period 706 is smaller than the retransmission round trip period and the priority of the DG PUSCH transmission is higher than or equal to the priority of the CG PUSCH transmission, the UE 102 determines that the time difference requirement is not satisfied and cancels the CG PUSCH transmission.

Figure 8:
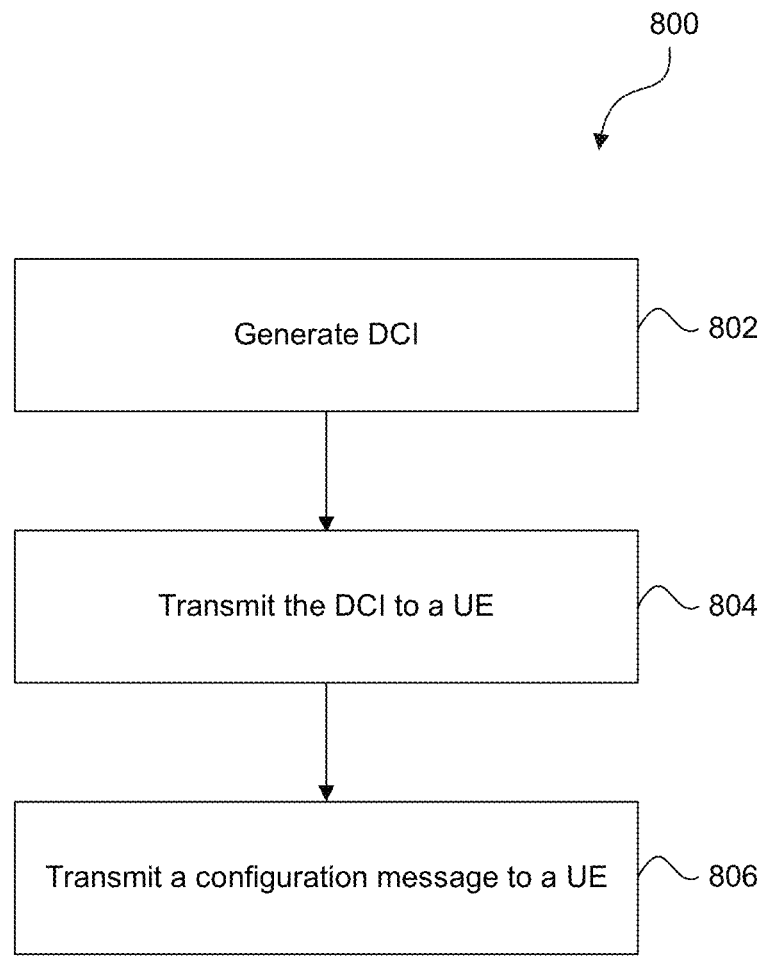
FIG. 8 illustrates an example method for instructing the UE for the multi-PUSCH scheduling, according to aspects of the disclosure.

FIG. 8 illustrates an example method 800 for instructing the UE for the multi-PUSCH scheduling. As a convenience and not a limitation, FIG. 8 may be described with regard to elements of FIGS. 1, 2, and 9. Method 800 may represent the operation of electronic devices (for example, the UE 102 and the base station 104 of FIG. 1) implementing the multi-PUSCH scheduling. The example method 800 may also be performed by system 200 of FIG. 2, controlled or implemented by processor 210, and/or computer system 900 of FIG. 9. But method 800 is not limited to the specific aspects depicted in those figures and other systems may be used to perform the method, as will be understood by those skilled in the art. It is to be appreciated that not all operations may be needed, and the operations may not be performed in the same order as shown in FIG. 8.

At 802, the base station 104 generates DCI. In some aspects, the DCI indicates one or more DG TBs corresponding to one or more DG PUSCH transmissions. The DCI can also indicate an initial DG HPN for the one or more DG PUSCH transmission, wherein the UE 102 assigns one or more DG HPNs to the one or more DG PUSCH transmissions based on the initial DG HPN.

At 804, the base station 104 transmits the DCI to the UE 102. In some aspects, the base station 104 transmits the DCI via a physical downlink control channel (PDCCH) transmission to the UE 102.

At 806, the base station 104 transmits a configuration message to the UE 102. In some aspects, the configuration message instructs the UE 102 to resolve a time conflict, as described in 314 of FIG. 3, and to resolve an HPN conflict, as described in 320 of FIG. 3. For example, the configuration message instructs the UE 102 to cancel or delay transmissions based on priorities. For another example, the configuration message instructs the UE 102 to adjust the initial DG HPN. In some aspects, the base station 104 transmits the configuration message via a higher layer transmission, such as an RRC transmission.

Figure 9:
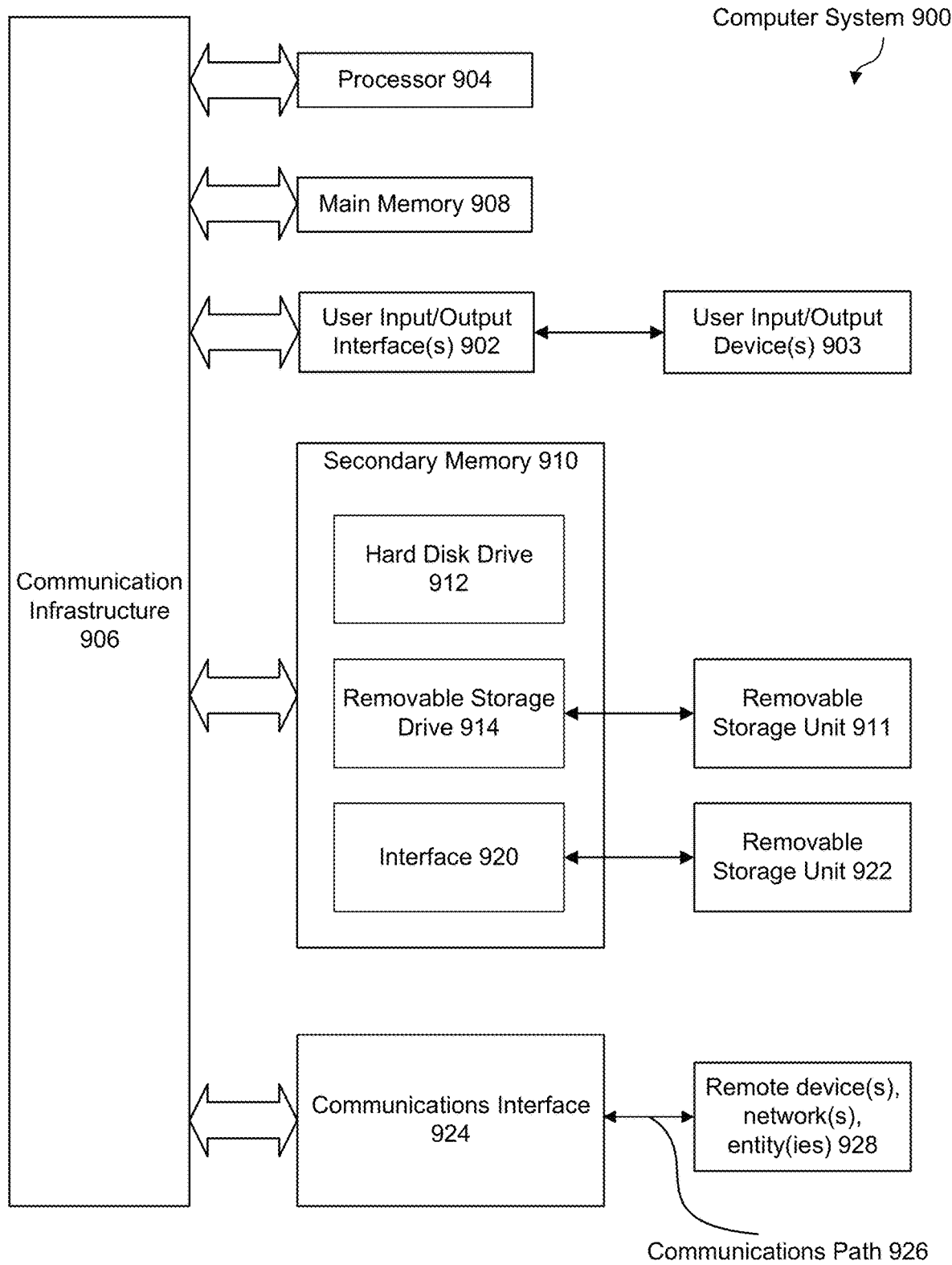
FIG. 9 is an example computer system for implementing some aspects of the disclosure or portion(s) thereof.

Various aspects may be implemented, for example, using one or more computer systems, such as computer system 900 shown in FIG. 9. Computer system 900 may be any well-known computer capable of performing the functions described herein such as the UE 102 and the base station 104 of FIG. 1, or 200 of FIG. 2. Computer system 900 includes one or more processors (also called central processing units, or CPUs), such as a processor 804. Processor 804 is connected to a communication infrastructure 806 (e.g., a bus.) Computer system 900 also includes user input/output device(s) 803, such as monitors, keyboards, pointing devices, etc., that communicate with communication infrastructure 806 through user input/output interface(s) 802. Computer system 900 also includes a main or primary memory 808, such as random access memory (RAM). Main memory 808 may include one or more levels of cache. Main memory 808 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some aspects, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 900, main memory 808, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 9. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE) comprising:
    a transceiver configured to enable wireless communication with a base station; and
    a processor, communicatively coupled to the transceiver, and configured to:
    determine one or more configured grant (CG) transport blocks (TBs) of one or more CG uplink transmissions;
    determine one or more dynamic grant (DG) TBs of one or more DG uplink transmissions;
    determine that a first CG TB of the one or more CG TBs overlaps with a first DG TB of the one or more DG TBs in time;
    compare a priority level of the first CG TB and a priority level of the first DG TB;
    determine that the priority level of the first CG TB is lower than the priority level of the first DG TB;
    transmit, using the transceiver and in the first DG TB, a first DG uplink transmission of the one or more DG uplink transmissions corresponding to the first DG TB;
    transmit, using the transceiver, DG uplink transmissions of the one or more DG uplink transmissions that follow the first DG uplink transmission; and
    cancel CG uplink transmissions of the one or more CG uplink transmissions that follow a first CG uplink transmission corresponding the first CG TB.

2. The UE of claim 1, wherein the processor is further configured to:
    determine that a second CG TB following the first CG TB does not overlap with the one or more DG TBs; and
    transmit, using the transceiver and in the second CG TB, the first CG uplink transmission of the one or more CG uplink transmissions corresponding to the first CG TB.

3. The UE of claim 1, wherein the processor is further configured to:
    determine that a second CG TB following the first CG TB does not overlap with the one or more DG TBs;
    cancel the first CG uplink transmission of the one or more CG uplink transmissions corresponding to the first CG TB; and
    transmit, using the transceiver and in the second CG TB, a second CG uplink transmission of the one or more CG uplink transmission corresponding to the second CG TB.

4. The UE of claim 1, wherein the processor is further configured to determine the one or more DG TBs of the one or more DG uplink transmissions by:
    receiving downlink control information (DCI) from the base station.

5. The UE of claim 4, wherein the processor is further configured to transmit the first DG uplink transmission in the first DG TB by:
    determining that the received DCI ends at a first time point;
    determining that the one or more CG TBs begin at a second time point; and
    determining that the first time point is before the second time point and a time difference between the first time point and the second time point is larger than a predetermined period.

6. The UE of claim 4, wherein the processor is further configured to transmit the first DG uplink transmission in the first DG TB by:
    determining that the received DCI ends at a first time point;
    determining that the first CG TB begins at a second time point; and
    determining that the first time point is before the second time point and a time difference between the first time point and the second time point is larger than a predetermined period.

7. The UE of claim 1, wherein the processor is further configured to:
    determine a CG hybrid automatic repeat request (HARQ) process number (HPN) corresponding to the first CG TB;
    determine a DG HPN corresponding to the first DG TB;
    determine that the CG HPN and the DG HPN are the same; and
    update the DG HPN.

8. The UE of claim 7, wherein the processor is further configured to update the DG HPN by:
    receiving downlink control information (DCI) from the base station, wherein the DCI includes information corresponding to the DG HPN;
    determining that the received DCI ends at a first time point;
    determining that the one or more CG TBs begin at a second time point; and
    determining that the first time point is before the second time point and a time difference between the first time point and the second time point is larger than a predetermined period.

9. The UE of claim 7, wherein the processor is further configured to update the DG HPN by:
    receiving downlink control information (DCI) from the base station, wherein the DCI includes information corresponding to the DG HPN;
    determining that the received DCI ends at a first time point;
    determining that the first CG TB begins at a second time point; and
    determining that the first time point is before the second time point and a time difference between the first time point and the second time point is larger than a predetermined period.

10. The UE of claim 7, wherein the processor is further configured to update the DG HPN by:
    determining that a time difference between the first CG TB and the first DG TB is smaller than a second predetermined period.

11. The UE of claim 10, wherein the second predetermined period is a retransmission round trip period.

12. The UE of claim 1, wherein the processor is further configured to:
    determine a CG hybrid automatic repeat request (HARQ) process number (HPN) corresponding to the first CG TB;
    determine a DG HPN corresponding to the first DG TB;
    determine that the CG HPN and the DG HPN are the same;
    determine that a time difference between the first CG TB and the first DG TB is smaller than a second predetermined period, wherein the second predetermined period is a retransmission round trip period; and
    cancel the first CG uplink transmission of the one or more CG uplink transmissions corresponding to the first CG TB.

13. A method of operating a user equipment (UE) comprising:
    determining one or more configured grant (CG) transport blocks (TBs) of one or more CG uplink transmissions;
    determining one or more dynamic grant (DG) TBs of one or more DG uplink transmissions;

determining that a first CG TB of the one or more CG TBs overlaps with a first DG TB of the one or more DG TBs in time;

comparing a priority level of the first CG TB and a priority level of the first DG TB;

determining that the priority level of the first CG TB is lower than the priority level of the first DG TB;

transmitting, in the first DG TB, a first DG uplink transmission of the one or more DG uplink transmissions corresponding to the first DG TB;

transmit DG uplink transmissions of the one or more DG uplink transmissions that follow the first DG uplink transmission; and cancel CG uplink transmissions of the one or more CG uplink transmissions that follow a first CG uplink transmission corresponding the first CG TB.

14. The method of claim 13, wherein the determining the one or more DG TBs of the one or more DG uplink transmissions further comprises:

receiving downlink control information (DCI) from a base station.

15. The method of claim 14, wherein the transmitting the first DG uplink transmission in the first DG TB further comprises:

determining that the received DCI ends at a first time point;

determining that the one or more CG TBs begin at a second time point; and determining that the first time point is before the second time point and a time difference between the first time point and the second time point is larger than a predetermined period.

16. The method of claim 13, further comprising:

determining a CG hybrid automatic repeat request (HARQ) process number (HPN) corresponding to the first CG TB;

determining a DG HPN corresponding to the first DG TB;

determining that the CG HPN and the DG HPN are the same; and updating the DG HPN.

17. The method of claim 13, further comprising:

determining a CG hybrid automatic repeat request (HARQ) process number (HPN) corresponding to the first CG TB;

determining a DG HPN corresponding to the first DG TB;

determining that the CG HPN and the DG HPN are the same;

determining that a time difference between the first CG TB and the first DG TB is smaller than a second predetermined period, wherein the second predetermined period is a retransmission round trip period; and canceling the first CG uplink transmission of the one or more CG uplink transmissions corresponding to the first CG TB.

18. A base station comprising:

a transceiver configured to enable wireless communication with a user equipment (UE); and a processor, communicatively coupled to the transceiver, and configured to:

generate downlink control information (DCI), wherein the DCI includes a dynamic grant (DG) TB and a DG hybrid automatic repeat request (HARQ) process number (HPN) of a DG uplink transmission;

transmit, using the transceiver, the DCI to the UE;

transmit, using the transceiver, a configuration message to the UE to instruct the UE to transmit the DG uplink transmission in the DG TB and cancel a configured grant (CG) uplink transmission in a CG TB by comparing priority levels of the DG TB and the CG TB in response to overlapping between the DG TB and the CG TB corresponding to the CG uplink transmission, wherein a priority level of the CG TB is lower than a priority level of the DG TB; and receiving, using the transceiver, the DG uplink transmission in the DG TB.

19. The base station of claim 18, wherein the configuration message further instructs the UE to update the DG HPN of the DG uplink transmission in response to a conflict between the DG HPN and a CG HPN of the CG uplink transmission . . .

20. The base station of claim 19, wherein the configuration message further instructs the UE to update the DG HPN in response to determining that the CG HPN and the DG HPN are the same.

* * * * *